United States Patent [19]

Lecrone

[11] Patent Number: 5,137,140
[45] Date of Patent: Aug. 11, 1992

[54] CONVEYOR APPARATUS HAVING DUAL POSITION PUSHING FINGERS AND FINGER POSITIONING MECHANISM

[75] Inventor: Dale S. Lecrone, Jackson, Mich.
[73] Assignee: LeMatic, Inc., Jackson, Mich.
[21] Appl. No.: 789,415
[22] Filed: Nov. 1, 1991

Related U.S. Application Data

[63] Continuation of Ser. No. 573,244, Aug. 24, 1990, abandoned.

[51] Int. Cl.⁵ .............................................. B65G 19/26
[52] U.S. Cl. .................................. 198/732; 198/735.1; 198/746; 198/836.3
[58] Field of Search ...................... 198/719, 732, 735.1, 198/743, 744, 746, 836.3

[56] References Cited

U.S. PATENT DOCUMENTS

| | | | |
|---|---|---|---|
| 1,116,406 | 11/1914 | Fleischer | 198/732 |
| 1,440,708 | 1/1923 | Tollefson | 198/732 |
| 1,740,582 | 12/1929 | Farmer | 198/732 X |
| 1,864,704 | 6/1932 | Wickman | 198/732 |
| 3,128,875 | 4/1964 | Kay et al. | 198/743 |
| 3,527,336 | 9/1970 | Johnston | 198/836.3 |
| 3,845,852 | 11/1974 | Langen et al. | 198/732 X |
| 3,917,053 | 11/1975 | Matsuyama | 198/719 |
| 4,342,387 | 8/1982 | Gray | 198/746 |

FOREIGN PATENT DOCUMENTS

688386  9/1979  U.S.S.R. ............... 198/732

*Primary Examiner*—Joseph E. Valenza
*Attorney, Agent, or Firm*—Flynn, Thiel, Boutell & Tanis

[57] ABSTRACT

A conveyor apparatus includes two space guide members over an upwardly facing support surface which can slidably support an article to be conveyed, and a pushing assembly supported for horizontal movement about the surface and having a plurality of pushing fingers which can engage the article and slide it across the surface. The pushing assembly is designed to permit movement of the outermost pushing fingers between a downwardly projecting position and a horizontally projecting position spaced above the surface and the guide members. A mechanism responsive to movement of the guide members toward each other is provided to automatically move the outermost fingers of the pushing assembly from the downwardly projecting position to the horizontally projecting position.

31 Claims, 4 Drawing Sheets

CONVEYOR APPARATUS HAVING DUAL POSITION PUSHING FINGERS AND FINGER POSITIONING MECHANISM

This application is a continuation of U.S. Ser. No. 07/573,244, filed Aug. 24, 1990, now abandoned.

FIELD OF THE INVENTION

This invention relates to an apparatus in which a pushing part pushes an article across a surface between two guide members and, more particularly, to such an apparatus in which the guide members are movable and in which the effective width of the pushing part must be adjustable.

BACKGROUND OF THE INVENTION

A known packaging machine has an upwardly facing surface which can slidably support articles to be conveyed, and has a plurality of pushing assemblies at spaced locations along an endless chain, each pushing assembly moving horizontally above the surface along one reach of the chain and having a plurality of rigid, downwardly projecting fingers which can engage the article and slide it along the surface. The article is located between two guide members, and the distance between the guide members can be adjusted to accommodate articles of different sizes.

One such machine is used for bakery products such as hamburger buns and hot dog buns, and the distance between the guide members is adjusted to accommodate different types of buns, or variation of the number or configuration of buns in each group of buns being slid across the surface. In this known machine, the preferred distance between the outermost fingers of each pushing assembly is preferably only slightly less than the distance between the two guide members. Thus, when the distance between the guide members is increased or decreased, different pushing assemblies are used. In particular, every pushing assembly on the endless chain is manually removed from the chain and replaced with a similar pushing assembly of larger or smaller width. The known machine typically has ten to fifteen pushing assemblies on the chain. Thus, although the machine has been satisfactory for its intended purposes, it has some disadvantages.

In particular, the machine must be turned off for at least thirty minutes to an hour while all of the pushing units are changed, which obviously is downtime during which no products are being produced and which also necessitates the expense of the manual labor involved in effecting the replacement of the pushing assemblies. Moreover, several separate sets of pushing assemblies, each set including ten to fifteen pushing assemblies, must be purchased and maintained, which involves significant expense as well as the risk that a necessary set or at least one pushing assembly of a set may be lost or misplaced, thereby creating additional downtime and expense until the problem can be remedied. There is also the problem that, if the operator forgets to change to narrower pushing assemblies when the distance between the guide members is decreased, the outer fingers of the pushing assemblies may be jammed against the guide members during operation of the machine, thereby bending or breaking the pushing fingers and/or the guide members, which leads to the expenses associated with downtime as well as the actual costs of repairing or replacing the damaged pushing fingers and/or guide members. Moreover, there is the risk of physical injury to the person changing the pushing assemblies in the event the machine is inadvertently turned on during the replacement process.

It is therefore an object of the present invention to provide an apparatus of the type discussed above which avoids the need to change all of the pushing assemblies when adjusting the distance between the guide members, in particular by providing a single set of pushing members which each have an effective width which can be varied.

It is a further object of the invention to provide such an apparatus in which the adjustment of the effective width of the pushing assemblies is carried out automatically in response to movement of one or both guide members.

It is a further object of the invention to provide such an apparatus in which the automatic adjustment of the effective widths of the pushing assemblies can be carried out in a very short period of time, while the machine is running, and without any need for an operator to contact movable parts of the machine which might cause physical injury.

It is a further object of the invention to provide such an apparatus which is durable, rugged, and requires little or no maintenance.

It is a further object of the invention to provide such an apparatus which operates smoothly, efficiently and quietly.

SUMMARY OF THE INVENTION

The objects and purposes of the invention, including those set forth above, are met by providing an apparatus which includes: an arrangement defining an upwardly facing support surface; and a pushing arrangement for sliding an article in a direction of movement on the support surface, the pushing arrangement including a pushing mechanism having a first pushing portion movable in the direction of movement and engageable with an article on the surface, and having a second pushing portion movable with the pushing mechanism in the direction of movement and supported for movement between first and second positions in which it is respectively engageable with and free of engagement with an article on the surface.

BRIEF DESCRIPTION OF THE DRAWINGS

A preferred embodiment of the invention will be described in detail hereinafter with reference to the accompanying drawings, in which.

DETAILED DESCRIPTION

Figure 1:
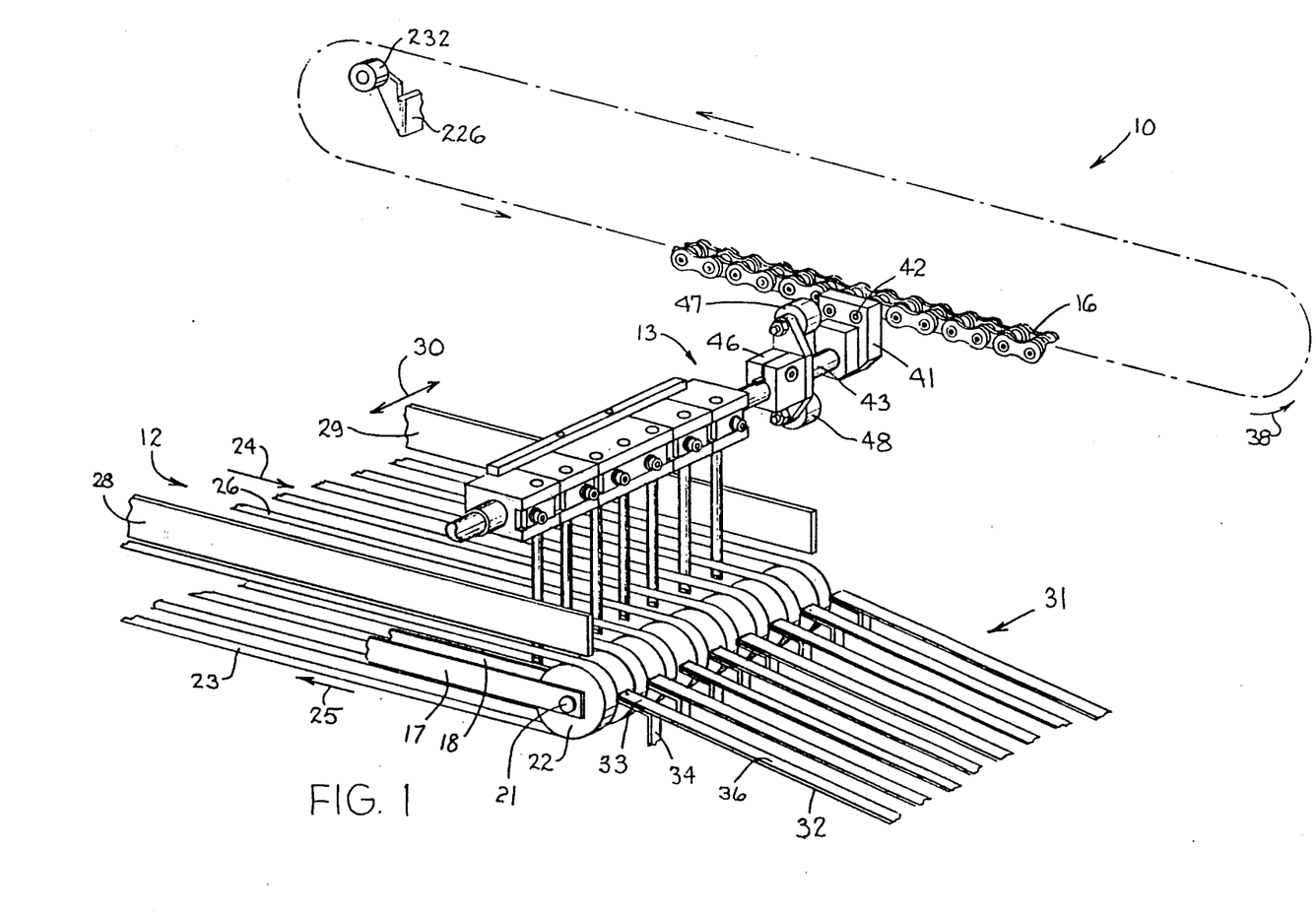
FIG. 1 is a fragmentary perspective view of part of a packaging machine embodying the present invention.

FIG. 1 is a perspective view of part of a packaging machine 10 which embodies the present invention, including a conveyor 12, and a pushing assembly 13 which is one of a plurality of identical pushing assemblies supported at uniformly spaced locations along two identical endless chains disposed on opposite sides of the conveyor 12, one of the chains being shown at 16.

The conveyor 12 includes a pair of elongate, spaced, parallel, support plates 17 and 18 which extend lengthwise of the conveyor 12, which have their not-illustrated left ends in FIG. 1 fixedly supported on a conventional and not-illustrated stationary part of the machine 10, and which have a short shaft 21 extending between and secured to their right ends. A pulley wheel 22 is rotatably supported on the shaft 21 between the support plates 17 and 18. Several additional pairs of support plates (not illustrated) support additional shafts and pulleys in a similar manner, the pulleys being uniformly axially spaced. Each of the pulley wheels 22 supports a respective one of several endless belts 23. The belts 23 are driven in a conventional and not illustrated manner by not-illustrated, rotationally driven pulleys provided at the left ends of the belts 23 in FIG. 1, the upper reaches of the belts 23 moving in a direction 24 and the lower reaches moving in the opposite direction 25. The upwardly facing surface portions on the upper reaches of each of the belts 23 together define an upwardly facing support surface 26 for articles to be conveyed by the conveyor 12. In the preferred embodiment, the articles conveyed are bakery products, for example a group of hamburger buns, some or all of which may be interconnected. For clarity, and since the articles conveyed are not part of the present invention, they are not shown in the drawings. It will be recognized that the illustrated apparatus could be used for a wide variety of other types of articles.

The conveyor 12 also includes two spaced, elongate guide plates 28 and 29 which each extend parallel to the direction of movement 24 of the upper reaches of the belts 23, which each have their lower edges disposed vertically higher than the upper reaches of the belts 23, and which are each supported by an arrangement described later for movement in directions 30 transverse to the direction of movement 24 of the upper reaches of belts 23. The guide plates 28 and 29 serve to guide movement along the conveyor of articles supported on the belts 23, and prevent the articles from falling off either side of the conveyor. Movement of the guide plates 28 and 29 in the directions 30 facilitates adjustment of the distance between the guide plates 28 and 29 in order to accommodate articles of different width, for example a group of hamburger buns as opposed to a group of hot dog buns.

The conveyor 12 also includes a discharge portion 31 having a plurality of elongate slats 32 which are spaced and parallel. Each of the slats 32 has an end 33 which is aligned with and adjacent a respective one of the endless belts 23, and which is fixedly secured to a stationary support element 34. The slats 32 extend downwardly at a small incline away from their ends 33, and have upper surface portions which together define an upwardly facing support surface 36 for slidably supporting articles discharged from the endless belts 23. The slats 32, aside from their incline, each extend approximately parallel to the direction 24.

The two endless chains 16 are situated symmetrically on opposite sides of the conveyor 12. The endless chain 16 is supported and driven in a conventional manner by not-illustrated sprockets, and moves in the direction shown by arrow 38.

The pushing assembly 13 includes a support part 41 which is fixedly secured to one of the links of the chain 16 by two pins or rivets 42. The support part 41 rotatably supports one end of a shaft 43, the other end of the shaft 43 being supported in a symmetric manner on the other chain by a similar support part. Near the support part 41, the shaft 43 has fixedly and nonrotatably secured to it a further support part 46, which rotatably supports two rollers 47 and 48. The rollers 47 and 48 are conventional and, in a conventional manner, can engage conventional and not-illustrated cams provided along the path of movement of the chain 16 so as to control the rotational orientation of the shaft 43. In the preferred embodiment, the rollers 47 and 48 and the associated cams permit little or no pivotal movement of the shaft 43, or in other words cause the shaft 43 to remain substantially in the angular orientation shown in FIG. 1 at all times.

Figure 2:
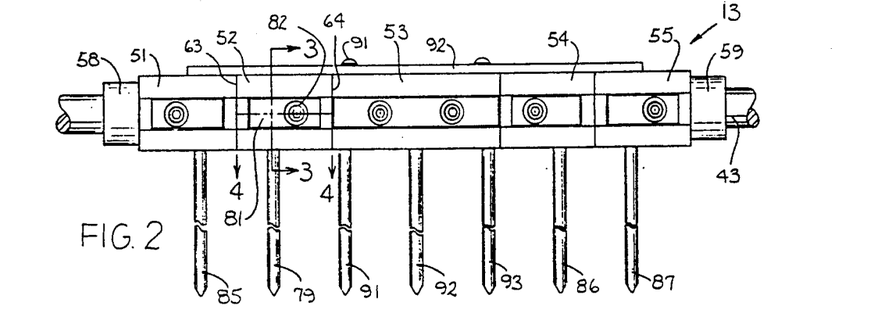
FIG. 2 is an elevational end view of a pushing assembly which is a component of the machine of FIG. 1 and which has movable pushing fingers.
Figures 3, 4, 5:
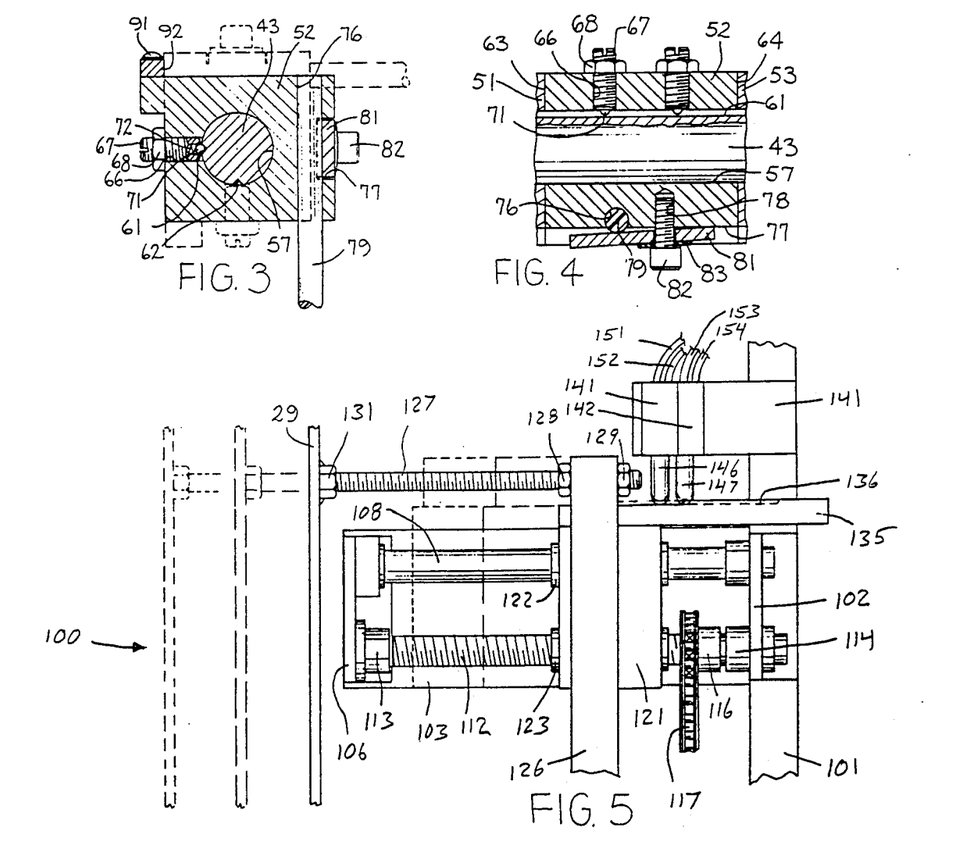
FIG. 3 is a sectional view taken along the line 3—3 in FIG. 2.
FIG. 4 is a sectional view taken along the line 4—4 in FIG. 2.
FIG. 5 is a fragmentary top view of a mechanism for effecting transverse movement of a guide member which is a component of the machine of FIG. 1.

The shaft 43 has supported on it near its axial center five finger support blocks 51 through 55 (FIG. 2). The shaft 43 extends through a cylindrical central opening provided in each block, as shown in FIG. 3 at 57 for block 52. The shaft 43 has a diameter only slightly smaller than that of the cylindrical opening 57, thereby permitting block 52 to pivot relative to shaft 43. As shown in FIG. 2, two annular collars 58 and 59 are fixedly secured to the shaft 43 by not-illustrated setscrews, in order to prevent axial movement of the blocks 51-55. The shaft 43 has two shallow, axially extending grooves 61 and 62 (FIGS. 3 and 4) which each have a V-shaped cross section and which are angularly offset from each other by approximately 90° on the circumference of the shaft 43. The grooves 61 and 62 extend from the collar 58 (FIG. 2) to the collar 59.

Referring to FIGS. 2 and 3, the support block 52 has two flat, axially facing end surfaces 63 and 64 which extend perpendicular to the axis of the shaft 43 and which slidably engage similar end surfaces provided on the adjacent blocks 51 and 53. Referring to FIGS. 3 and 4, the support block 52 has two axially spaced threaded openings 66 extending thereinto from an external surface in a direction perpendicular to the axis of central opening 57, each of the threaded openings 66 opening into the central opening 57. Each of the threaded openings 66 has in it a screw stud 67 which is secured against rotation by a lock nut 68. As shown in FIG. 3, each screw stud 67 has extending into it from the end adjacent the shaft 43 an axial passage which contains an axially movable ball adjacent the shaft 43 and a compression spring 72 yieldably urging the ball toward the shaft 43. The diameter of the passage at the end nearest the shaft 43 is slightly smaller than the diameter of the ball 71, so that the ball 71 cannot escape from the passage. The screw stud 67, including the ball 71 and spring 72 therein, is a conventional and commercially available part, and therefore not described in further detail.

The support block 52 has, on a side of the shaft 43 opposite from the threaded openings 66, a cylindrical finger opening 76, the opening 76 extending through block 52 perpendicular to the central opening 57 and the threaded openings 66. The block 52 has in a side surface thereof a shallow groove 77 of rectangular cross section which extends parallel to the shaft 43 and which communicates with an edge portion of the finger opening 76. An elongate cylindrical finger 79 made of a plastic or fiberglass material has one end disposed in the finger opening 76, and the remainder of the finger 79 projects outwardly away from the block 52, and terminates in a pointed lower end (FIG. 2). As evident from FIG. 4, a portion of the finger 79 thus projects into groove 77. The groove 77 has in it a flat metal plate 81, which is fixedly secured to the block 52 by a screw 82 extending through an opening in plate 81 and threadedly engaging a threaded opening 78 provided in block 52. A lock washer 83 may be provided under the head of the screw 82. The frictional engagement of the plate 81 with the finger 79 is sufficient to prevent axial movement of the finger 79 relative to block 52 during normal system operation, although in an unusual situation where the finger 79 hits an obstruction which urges it axially, the finger 79 can slide axially relative to block 52 and plate 81.

As evident from FIG. 3, the block 52 and its finger 79 can pivot through an angle of 90° from an operational position which is shown in solid lines and in which the ball 71 engages groove 61 to a retracted position which is shown in broken lines and in which the ball 71 engages groove 62. The engagement of ball 71 with the groove 61 or 62 under the urging of spring 72 serves to yieldably maintain the block 52 and finger 79 in one of the operational and retracted positions.

The blocks 51, 54 and 55 are each substantially identical to the block 52, can each pivot through an angle of 90° in a manner similar to block 52, and each support a respective pushing finger 85, 86 or 87. Blocks 51, 52, 54 and 55 pivot on shaft 43 independently of each other. Each block 51-55 and the finger or fingers thereon may be regarded as respective pushing portion.

The center block 53 is similar to block 52, except that block 53 has a slightly greater axially length and supports three pushing fingers 91-93 rather than one finger. Moreover, the block 53 is secured against pivotal movement relative to the shaft 43. In particular, instead of the screw studs 67 which are provided in the block 52 and which have the ball 71 biased by spring 72, block 53 has two screw studs which do not include a ball and spring but instead have a solid pointed end which engages the groove 61 in order to prevent the block 53 from rotating relative to the shaft 43. Consequently, since there is little or no pivotal movement of shaft 43 as the chain 16 follows its path of movement, the fingers 91-93 of block 53 always point in a generally downward direction as the pushing assembly 13 moves along the entire path of movement of the chain 16.

As shown in FIGS. 2 and 3, the center block 53 has secured to its upper surface by two screws 91 an elongate rectangular bar 92 which extends parallel to the shaft 43, the opposite ends of the bar 92 being disposed in the regions of the outermost support block 51 and 55. As shown in FIG. 3, the movable blocks 51, 52, 54 and 55 are engaged by the bar 92 in each of their operational and retracted positions, in order to prevent them from pivoting past either of these positions.

Referring to FIG. 1, it will be evident that, as the pushing assembly 13 is moved in the direction 24 by the lower reach of chain 16, the downwardly projecting fingers of pushing assembly 13 each project downwardly between and move between a respective pair of adjacent belts 23, and eventually pass between two adjacent pulley wheels 22, and then into the region between a respective pair of adjacent slats 32. It will be recognized that a further conveyor similar to the conveyor 12 could be provided below the conveyor 12, and that the fingers of the pushing assembly 13 could be extended in length so that they reach the further conveyor and simultaneously push articles on both conveyors.

The guide plates 28 and 29 are moved by respective identical mechanisms, one of which is shown at 100 in FIG. 5. Referring to FIG. 5, the machine 10 includes a stationary frame member 101, to which is fixedly secured an upwardly projecting plate 102 and a horizontally projecting plate 103, the plate 103 having fixedly secured to its left end in FIG. 5 an upwardly projecting plate 106.

A cylindrical metal rod 108 has its ends fixedly secured to the plates 102 and 106. Also, conventional bearings or bushings 113 and 114 are respectively mounted on the plates 106 and 102, and rotatably support respective ends of a threaded cylindrical shaft 112 while holding the shaft 112 against axial movement. A sprocket 116 is fixedly secured on the shaft 112 adjacent the bearing 114, and a chain 117 engaging the sprocket can be driven by a conventional and not-illustrated motor in order to effect selective rotation of the shaft 112.

A metal block 121 has two cylindrical holes extending through it, one of which has force fit in it a sleevelike bronze bushing 122 and the other of which has force fit in it a sleevelike nut 123. The bushing 122 slidably receives the cylindrical rod 108, and the nut 123 threadedly engages the shaft 112. Thus, as the chain 117 effects rotation of the shaft 112 in respective directions, the block 121 moves leftwardly and rightwardly in FIG. 5 with respect to frame member 101 and plates 102, 103 and 106.

An upright support frame 126 has its lower end fixedly secured to the upper side of the block 121. A threaded rod 127 has an end which extends through an opening provided in the support frame 126 at a location spaced vertically above the block 121, and is fixedly secured to the support frame 126 by two nuts 128 and 129. The guide plate 29 has welded to it a further nut 131, which threadedly engages the opposite end of the threaded rod 127. One or more additional threaded metal rods 127 (not illustrated) are provided along the length of frame 126 and plate 29 in a similar manner. Thus, the guide plate 29 is fixedly supported on the support frame 126 and block 121, and reciprocally moves in synchronism with the block 121. The threaded rods 127 are located vertically higher than the upper surface 26 (FIG. 1) of the conveyor 12, and thus the rod 127 can move the guide plate 29 transversely above the belts of the conveyor without interfering with the operation of the conveyor.

A cam plate 135 has one end fixedly secured to the block 121, and extends parallel to the rod 108. The cam plate 135 has on one side two vertically spaced cam surfaces 136 extending lengthwise of it, the cam surfaces 136 being parallel and adjacent.

A plate 141 is fixedly secured to the frame member 101, and supports two conventional pneumatic valves 142 and 143 which have respective movable control elements 146 and 147, each control element slidably engaging a respective one of the cams 136. The valves 141 and 142 are supplied with compressed air in a Conventional manner from a Conventional and not-illustrated source of compressed air. The valve 141 supplies compressed air through a selected one of two pneumatic tubes 151 and 152 in dependence on whether or not it is actuated by control element 146 under control of the associated cam 136. Similarly, the valve 142 supplies compressed air to a selected one of two pneumatic tubes 153 and 154 in dependence on whether or not it is actuated.

As mentioned above, a mechanism which is a mirror image of that shown in FIG. 5 is provided on the opposite side of the machine to control the guide plate 28. However, it will be recognized that the threaded shaft 112 shown in FIG. 5 could alternatively extend beneath the conveyor 12 of FIG. 1 and drive the mechanism controlling movement of the guide plate 28, in which case only a single motor would be used to effect movement of both guide plates, and in which case the cam plate 135 and associated valves 141 and 142 could be provided only on one side of the machine.

Figures 6, 7:
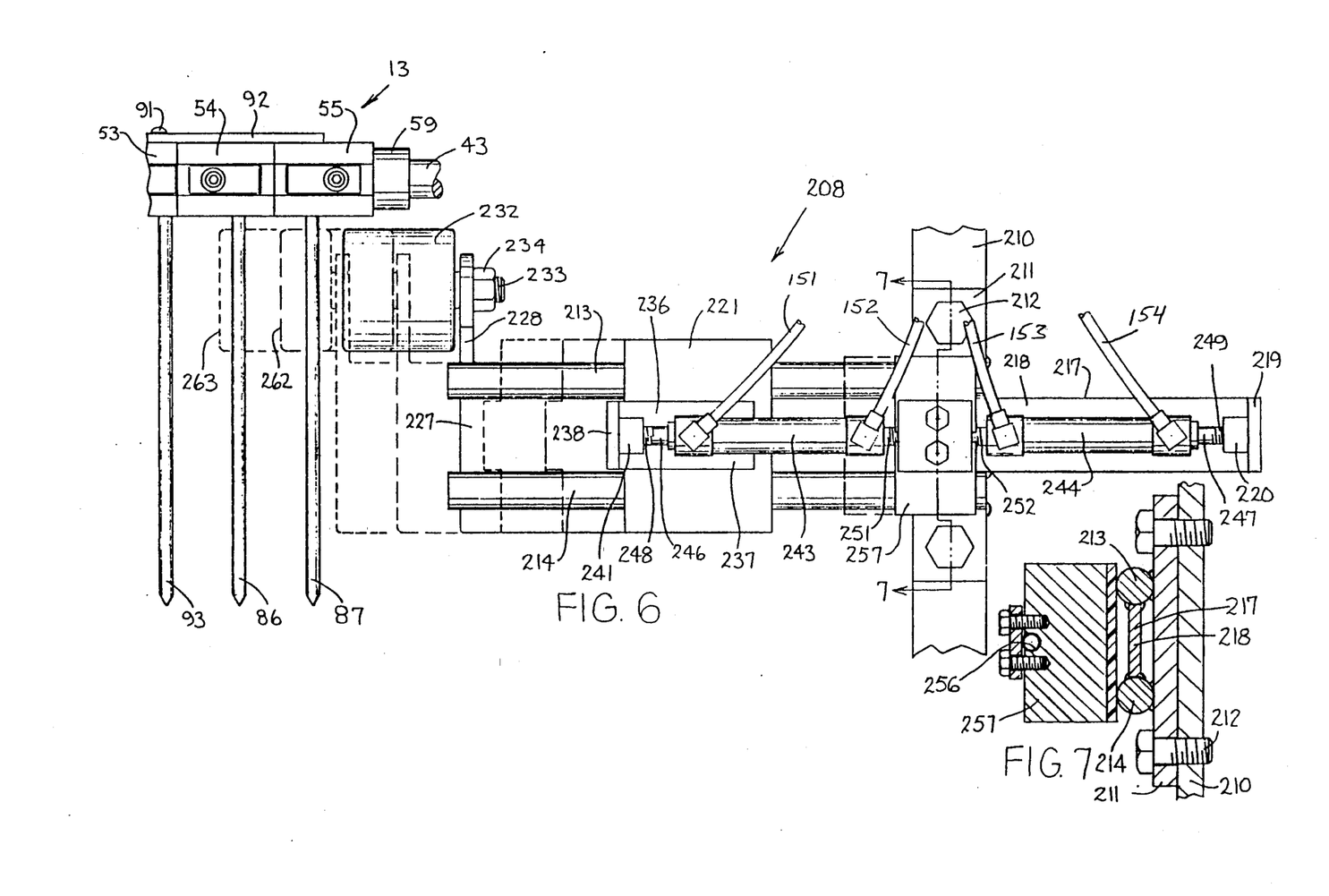
FIG. 6 is a fragmentary elevational end view of a portion of the pushing assembly of FIG. 2 in a different operational position and of an operating mechanism for automatically moving the pushing fingers of the pushing assembly.
FIG. 7 is a sectional view taken along the line 7-7 in FIG. 6.
Figure 8:
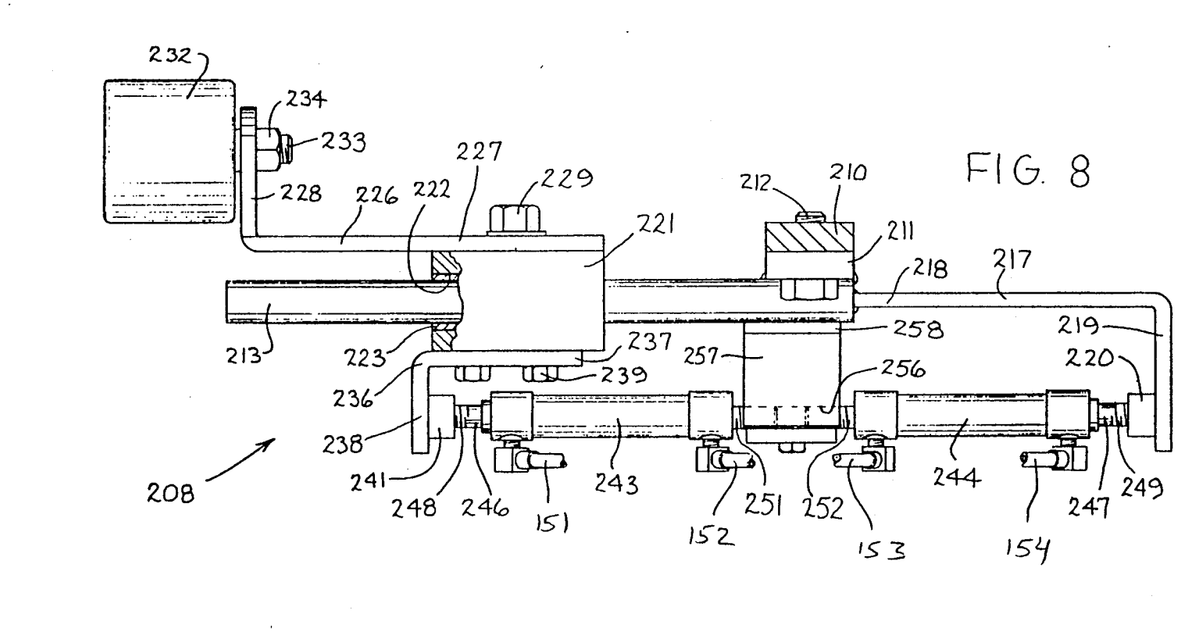
FIG. 8 is a top view of the operating mechanism of FIG. 6.

FIGS. 6-8 show a mechanism 208 which can automatically move the support blocks 54 and 55 (and the fingers 86 and 87 supported thereon) from their operational to their retracted positions in response to inward movement of the guide plate 29. This occurs when the pushing assembly 13 is in an operational position different from that shown in FIG. 1, in particular when the pushing assembly 13 is moving leftwardly in FIG. 1 with the upper reach of chain 16 and is nearing the end of the upper reach. On the opposite side of the packaging machine is a mechanism which is a mirror image of, but otherwise identical to, the mechanism 208, and which moves the support blocks 51 and 52 (and fingers 85 and 79) from their operational to their retracted positions in response to inward movement of the guide plate 28. Since the two mechanisms are identical, only the mechanism 208 is described in detail.

In FIGS. 6-8, a stationary frame element 210 of the machine has a vertical metal plate 211 secured to it by two screws 212. Two horizontally extending and vertically spaced parallel metal rods 213 and 214 each have one end welded to the metal plate 211. An L-shaped metal plate 217 has a leg 218 which is disposed between and welded to the rods 213 and 214 (or alternatively could be welded directly to the plate 211), and has a leg 219 which has welded thereto a nut 220. A metal block 221 has two parallel cylindrical openings therethrough, one of which is shown at 222 in FIG. 8, each such opening having therein a cylindrical bronze bushing, one of which is shown at 223 in FIG. 8. The bushings 223 each slidably receive a respective one of the metal rods 213 and 214, thereby supporting the block 221 for sliding movement along the rods 213 and 214.

An L-shaped plate 226 has a leg 227 which is secured by two bolts 229 to the block 221, and has a leg 228 which, as evident from FIG. 6, extends vertically higher than the leg 227. A cylindrical plastic roller 232 is rotatably supported on a shaft 233, the shaft 233 being secured to the upper end of leg 228 of plate 226 by a nut 234.

A further L-shaped plate 236 has a leg 237 which is secured to the block 221 by two bolts 239, and has a further leg 238 which has welded to it a nut 241.

Two conventional double-acting pneumatic cylinders 243 and 244 have respective piston rods 246 and 247, the piston rods 246 and 247 having threaded ends 248 and 249 which respectively threadedly engage the nuts 241 and 220. The housings of the cylinders 243 and 244 have threaded studs 251 and 252 which each threadedly engage a common threaded opening 256 provided in a metal block 257. The block 257 has secured to it a plastic plate 258 which, as shown in FIG. 7, slidably engages the surfaces of the rods 213 and 214.

OPERATION

Referring to FIG. 1, assume that the guide plates 28 and 29 are each initially in their outermost positions and that the support blocks of each pushing assembly 13 are oriented so that their fingers all extend downwardly. Referring to FIG. 5, if the motor which drives the chain 117 is actuated and rotates the threaded shaft 112, the nut 123 will cause the guide plate 29 to slowly move inwardly over the conveyor, while the equivalent mechanism effects inward movement of the guide plate 28. During this movement, the valve 141 will be actuated by its cam 136 and will supply suppressed air through tube 152 to the pneumatic cylinder 243, causing the piston rod 246 of cylinder 243 to be extended so that the block 221 slides leftwardly on rods 213 and 214 and causes roller 232 to move leftwardly to the position shown in broken lines at 262 in FIG. 6. As evident from FIGS. 1 and 6, in this position the roller 232 is disposed in the path of movement of the finger 87 of support block 55 of each pushing assembly 13 as the pushing assembly is moving leftwardly with the upper reach of chain 16 in FIG. 1, and thus the finger 87 will engage roller 232 and roller 232 will pivot the support block 55 and finger 87 through an angle of 90° from the operational position to the retracted position. In this position, the block 55 and finger 87 of each pushing assembly 13 are both spaced above the upper edge of guide plate 29, even when the pushing assembly is moving in the direction 24 with the lower reach of chain 16 as shown in FIG. 1, thereby preventing the finger 87 and plate 29 from being jammed against each other in a manner which might damage one or both. As the chain 16 makes a full circuit, the roller 232 will move the block 55 and finger 87 of every pushing assembly 13 from the operational to the retracted position.

If the motor driving the chain in FIG. 5 continues to move the guide plate 29 inwardly, the valve 142 will eventually be actuated by its cam and supply compressed air through the tube 153 to pneumatic cylinder 244, causing cylinder 244 to extend its piston rod 247, thereby causing leftward movement of block 257 and extended cylinder 243, extended cylinder 243 in turn causing simultaneous leftward movement of block 221 so that roller 232 is moved further leftwardly to the position shown in broken lines at 263 in FIG. 6. It will be noted that, in this position, the roller 232 is disposed in the path of movement of both of the fingers 86 and 87, and thus will ensure that both of these fingers on every pushing assembly 13 are automatically moved from their operational to their retracted positions.

When the motor driving the chain 117 in FIG. 5 is eventually actuated in a reverse direction, it will move the guide plate 29 back to its original position, during which movement the valves 142 and 141 will be successively deactuated by their cams and cause the cylinders 244 and 243 to successively retract due to compressed air supplied through tubes 154 and 151, as a result of which the roller 232 in FIG. 6 will automatically move from the position shown at 263 to the position shown at 262 and then to its original position shown in solid lines. In the disclosed embodiment, the support blocks 51, 52, 54 and 55 are manually returned from their retracted to their operational positions. However, it will be recognized that additional mechanisms similar to that shown in FIGS. 6-8 could be provided near the right end of the endless loop of chain 16 in FIG. 1, and could automatically move the support blocks from their retracted to their operational positions as the guide plates 28 and 29 are moved progressively outwardly.

Although one preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus comprising: means defining an upwardly facing support surface; and pushing means for sliding an article in a direction of movement on said support surface, said pushing means including a pushing mechanism movable in said direction along a portion of a path of movement and having a first pushing portion engageable with an article on said surface as said first pushing portion moves with said pushing mechanism in said direction of movement along said portion of said path of movement, having a second pushing portion supported for movement relative to said first pushing portion between operational and retracted positions in which it is respectively engageable with and free of engagement with an article on said surface as said second pushing portion moves with said pushing mechanism in said direction of movement along said portion of said path of movement, and having means for yieldably resisting movement of said second pushing portion from said operational position to said retracted position, wherein said pushing mechanism further includes means for yieldably resisting movement of said second pushing portion from said retracted position to said operational position.

2. An apparatus as recited in claim 1, wherein said pushing mechanism includes a third pushing portion which is disposed on a side of said first pushing portion remote from said second pushing portion and which is supported for movement relative to said first pushing portion between operational and retracted positions in which it is respectively engageable with and free of engagement with an article on said surface as said third pushing portion moves with said pushing mechanism in said direction of movement along said portion of said path of movement, said pushing mechanism including means for yieldably resisting movement of said third pushing portion from said operational position thereof to said retracted position thereof.

3. An apparatus as recited in claim 1, including a guide member extending generally in said direction of movement and supported above said surface for movement transversely to said direction of movement, said second pushing portion being free of engagement with said guide member in said retracted position of said second pushing portion.

4. An apparatus as recited in claim 1, wherein said pushing mechanism includes a shaft extending transversely to said direction of movement and supported for movement parallel to said direction of movement, means fixedly supporting said first pushing portion on said shaft, a support member pivotally supported on said shaft and having said second pushing portion fixedly disposed thereon, and means for preventing pivotal movement of said support member beyond said operational and retracted positions of said second pushing portion; wherein said means yieldably resisting includes said shaft having two circumferentially spaced grooves, includes means supporting a retaining ball on said support member for movement radially of said shaft, and includes resilient means for yieldably urging said retaining ball toward said shaft, said retaining ball engaging a respective one of said grooves in each of said operational and retracted positions of said support member.

5. An apparatus as recited in claim 4, wherein said pushing portions each include an elongate finger.

6. An apparatus comprising: means defining an upwardly facing support surface; and pushing means for sliding an article in a direction of movement on said support surface, said pushing means including a pushing mechanism movable in said direction along a portion of a path of movement and having a first pushing portion engageable with an article on said surface as said first pushing portion moves with said pushing mechanism in said direction of movement along said portion of said path of movement, having a second pushing portion supported for movement relative to said first pushing portion between operational and retracted positions in which it is respectively engageable with and free of engagement with an article on said surface as said second pushing portion moves with said pushing mechanism in said direction of movement along said portion of said path of movement; including a guide member extending generally in said direction of movement and supported above said surface for movement transversely to said direction of movement, said second pushing portion being free of engagement with said guide member in said retracted position of said second pushing portion; wherein said pushing portions are each an elongate finger, said first pushing portion extending approximately vertically, and said second pushing portion extending approximately vertically in said operational position thereof; wherein said pushing mechanism includes a shaft extending transversely to said direction of movement and supported above said surface for movement parallel to said direction of movement, means fixedly supporting an upper end of said finger of said first pushing portion on said shaft, and means supporting said finger of said second pushing portion on said shaft for pivotal movement between said operational and retracted positions; wherein in said retracted position said finger of said second pushing portion is vertically higher than said guide member; wherein said second pushing portion includes a support member pivotally supported on said shaft and having said finger of said second pushing portion fixedly supported thereon, and means for preventing pivotal movement of said support member beyond said operational and retracted positions; wherein said shaft has two circumferentially spaced grooves; including means supporting a retaining ball on said support member for movement radially of said shaft; and including resilient means for yieldably urging said retaining ball toward said shaft, said retaining ball engaging a respective one of said grooves in each of said operational and retracted positions of said support member.

7. An apparatus comprising: means defining an upwardly facing support surface; and pushing means for sliding an article in a direction of movement on said support surface, said pushing means including a pushing mechanism movable in said direction along a portion of a path of movement and having a first pushing portion engageable with an article on said surface as said first pushing portion moves with said pushing mechanism in said direction of movement along said portion of said path of movement, and having a second pushing portion supported for movement relative to said first pushing portion between operational and retracted positions in which it is respectively engageable with and free of engagement with an article on said surface as said second pushing portion moves with said pushing mechanism in said direction of movement along said portion of said path of movement; including a guide member extending generally in said direction of movement and supported above said surface for movement transversely to said direction of movement, said second pushing portion being free of engagement with said guide member in said retracted position of said second pushing portion; wherein said pushing portions are each an elongate finger, said first pushing portion extending approximately vertically, and said second pushing portion extending approximately vertically in said operational position thereof; wherein said pushing mechanism includes a shaft extending transversely to said direction of movement and supported above said surface for movement parallel to said direction of movement, means fixedly supporting an upper end of said finger of said first pushing portion on said shaft, and means supporting said finger of said second pushing portion on said shaft for pivotal movement between said operational and retracted positions; wherein in said retracted position said finger of said second pushing portion is vertically higher than said guide member; wherein said second pushing portion includes a support member pivotally supported on said shaft and having said finger of said second pushing portion fixedly supported thereon, and means for preventing pivotal movement of said support member beyond said operational and retracted positions; wherein said support member has an opening therethrough which receives an end of said finger of said second pushing portion and which opens through an external surface of said support member; and including a metal plate fixedly secured to said external surface and frictionally engaging said finger in said opening.

8. An apparatus comprising: means defining an upwardly facing support surface; and pushing means for sliding an article in a direction of movement on said support surface, said pushing means including a pushing mechanism movable in said direction along a portion of a path of movement and having a first pushing portion engageable with an article on said surface as said first pushing portion moves with said pushing mechanism in said direction of movement along said portion of said path of movement, having a second pushing portion supported for movement relative to said first pushing portion between operational and retracted positions in which it is respectively engageable with and free of engagement with an article on said surface as said second pushing portion moves with said pushing mechanism in said direction of movement along said portion of said path of movement; including a guide member extending generally in said direction of movement and supported above said surface for movement transversely to said direction of movement, said second pushing portion being free of engagement with said guide member in said retracted position of said second pushing portion; wherein said pushing portions are each an elongate finger, said first pushing portion extending approximately vertically, and said second pushing portion extending approximately vertically in said operational position thereof; wherein said pushing mechanism includes a shaft extending transversely to said direction of movement and supported above said surface for movement parallel to said direction of movement, means fixedly supporting an upper end of said finger of said first pushing portion on said shaft, and means supporting said finger of said second pushing portion on said shaft for pivotal movement between said operational and retracted positions; wherein in said retracted position said finger of said second pushing portion is vertically higher than said guide member; wherein said second pushing portion includes a support member pivotally supported on said shaft and having said finger of said second pushing portion fixedly supported thereon, and means for preventing pivotal movement of said support member beyond said operational and retracted positions; wherein said means for limiting pivotal movement of said support member includes a further support member which is nonrotatably supported on said shaft and which supports said finger of said first pushing portion, said further support member having thereon an elongate bar which extends parallel to said shaft, said bar engaging said first-mentioned support member in said operational and retracted positions of said first pushing portion.

9. An apparatus as recited in claim 5, wherein said means defining said upwardly facing support surface includes a plurality of parallel, spaced members each having thereon an upwardly facing surface portion, said fingers of said first and second pushing portions each having an outer end disposed between a respective pair of said parallel members during movement of said pushing mechanism in said direction of movement along said portion of said path of movement while said second pushing portion is in said operational position.

10. An apparatus comprising: means defining an upwardly facing support surface; and pushing means for sliding an article in a direction of movement on said support surface, said pushing means including a pushing mechanism movable in said direction along a portion of a path of movement and having a first pushing portion engageable with an article on said surface as said first pushing portion moves with said pushing mechanism in said direction of movement along said portion of said path of movement, having a second pushing portion supported for movement relative to said first pushing portion between operational and retracted positions in which it is respectively engageable with and free of engagement with an article on said surface as said second pushing portion moves with said pushing mechanism in said direction of movement along said portion of said path of movement; including a guide member extending generally in said direction of movement and supported above said surface for movement transversely to said direction of movement, said second pushing portion being free of engagement with said guide member in said retracted position of said second pushing portion; and including means responsive to movement of said guide member for effecting movement of said second pushing portion from its operational position to its retracted position.

11. An apparatus as recited in claim 10, wherein said means for moving said second pushing portion includes an actuating member which is moved between first and second positions disposed in and spaced from a path of movement of said second pushing portion.

12. An apparatus as recited in claim 11, wherein said actuating member is a cylindrical roller supported for rotation about an axis extending transversely to said direction of movement.

13. An apparatus as recited in claim 11, wherein said means for moving said second pushing portion includes a fluid actuated cylinder having a first end supported on a stationary frame element and a second end operationally coupled to said actuating member, and means for supplying fluid to said cylinder in response to movement of said guide member.

14. An apparatus as recited in claim 13, wherein said means for supplying fluid to said cylinder includes a cam which is movable relative to and engageable with a fluid control valve, one of said cam and said valve being stationarily supported and the other thereof being operatively coupled to said guide member for movement therewith, said valve supplying fluid to said cylinder when said valve is actuated by said cam in response to movement of said guide member.

15. An apparatus as recited in claim 13, wherein said pushing mechanism includes a third pushing portion which is disposed between said first and second pushing portions and which is supported for movement relative to said first pushing portion and independently of said second pushing portion between operational and retracted positions in which it is respectively engageable with and free of engagement with an article on said surface as said third pushing portion moves with said pushing mechanism in said direction of movement along said portion of said path of movement, and wherein said actuating element is movable past said first position thereof to a third position disposed in a path of movement of said third pushing portion.

16. An apparatus as recited in claim 15, wherein said actuating means includes a further fluid-actuated cylinder having a first end coupled to said second end of said first-mentioned cylinder and a second end operationally coupled to said actuating member, and said means for supplying fluid successively supplies fluid to said first-mentioned and further cylinders in response to progressive movement of said guide member.

17. An apparatus as recited in claim 16, including two parallel and horizontally extending rods each having one end secured to said frame element, a sliding block slidably supported on said rods and means supporting said actuating element on said sliding block; said first end of said first-mentioned cylinder being supported on said frame element and said second end of said further cylinder being coupled to said sliding block.

18. An apparatus as recited in claim 17, including an L-shaped member having a first leg fixedly supported on said frame element and having said first end of said first-mentioned fluid cylinder supported on a second leg thereof; including a further block having said second end of said first-mentioned cylinder and said first end of said further cylinder fixedly coupled thereto and having a surface slidably engaging said rods; and including an L-shaped member having a first leg fixedly secured to said sliding block and having said actuating member supported on a second leg thereof, said actuating member being a roller supported for rotation about an axis substantially parallel to said rods.

19. An apparatus as recited in claim 18, including cam means supported for movement relative to first and second valves, one of said cam means and said valves being stationarily supported and the other thereof being coupled to said guide member for movement therewith; said cam means successively actuating said first and second valves in response to progressive movement of said guide member, each of said valves supplying fluid to a respective one of said cylinders when actuated.

20. An apparatus as recited in claim 5, wherein said support member has an opening therethrough which receives an end of said finger of said second pushing portion and which opens through an external surface of said support member, and including a metal plate fixedly secured to said external surface and frictionally engaging said finger in said opening.

21. An apparatus as recited in claim 5, wherein said means for limiting pivotal movement of said support member includes a further support member which is nonrotatably supported on said shaft and which supports said finger of said first pushing portion, said further support member having thereon an elongate bar which extends parallel to said shaft, said bar engaging said first-mentioned support member in said operational and retracted positions of said first pushing portion.

22. An apparatus as recited in claim 1, wherein said pushing means includes an elongated drive chain supported for lengthwise movement substantially parallel to said direction of movement and having a plurality of said pushing mechanism supported thereon at spaced locations therealong.

23. An apparatus comprising: means defining an upwardly facing support surface; pushing means for sliding an article in a direction of movement on said support surface, said pushing means including a pushing mechanism movable in said direction along a portion of a path of movement and having a first pushing portion engageable with an article on said surface as said first pushing portion moves with said pushing mechanism in said direction of movement along said portion of said path of movement, and having a second pushing portion supported for movement relative to said first pushing portion between operational and retracted positions in which it is respectively engageable with and free of engagement with an article on said surface as said second pushing portion moves with said pushing mechanism in said direction of movement along said portion of said path of movement, selectively actuable means for automatically positioning said second pushing portion in said retracted position as said pushing mechanism moves along said path of movement in advance of said portion thereof, means for thereafter maintaining said second pushing portion in said retracted position as said second pushing portion moves along said portion of said path of movement, a guide rail supported above said support surface for movement in a direction transverse to said direction of movement, and means responsive to movement of said guide rail for selectively actuating said selectively actuable means.

24. An apparatus as recited in claim 23, wherein said selectively actuable means includes an actuating member which is respectively moved to first and second positions when said selectively actuable means is respectively actuated and deactuated, wherein in said first position said actuating member is disposed in said path of movement of said second pushing portion so that said second pushing portion engages said actuating member and is moved thereby to said retracted position in response to movement of said pushing mechanism along said path of movement.

25. An apparatus as recited in claim 24, wherein said selectively actuable means includes a fluid-actuated cylinder operationally coupled to said actuating member for effecting movement thereof between said first and second positions.

26. An apparatus as recited in claim 25, wherein said means responsive to movement of said guide rail selectively supplies pressurized fluid to said fluid-actuated cylinder.

27. An apparatus as recited in claim 23, wherein said pushing means includes a movable drive element and means supporting said first pushing portion on said drive element for pivotal movement about an axis transverse to said direction of movement, includes a stationary cam, and includes a cam follower engageable with said cam and means for controlling the pivotal position of said first pushing portion relative to said drive element based on engagement of said cam follower and said cam.

28. An apparatus as recited in claim 27, wherein said cam follower is rotatably supported roller, and wherein said drive element is an elongate chain supported for lengthwise movement.

29. An apparatus as recited in claim 23, wherein said second pushing portion pivots between said operational and retracted positions about an axis transverse to said direction of movement.

30. An apparatus as recited in claim 29, including first and second support members supported for pivotal movement relative to each other about said transverse axis, and wherein said first and second pushing portions are each an elongate finger having one end fixedly supported on a respective one of said first and second support members.

31. An apparatus as recited in claim 30, wherein said means defining said upwardly facing support surface includes a plurality of parallel, spaced members each having thereon an upwardly facing surface portion, said fingers of said first and second pushing portions each having a portion movably disposed between a respective pair of said parallel members during movement of said pushing mechanism in said direction of movement while said second pushing portion is in said operational position.

* * * * *

UNITED STATES PATENT AND TRADEMARK OFFICE
CERTIFICATE OF CORRECTION

PATENT NO. : 5 137 140
DATED : August 11, 1992
INVENTOR(S) : Dale S. LECRONE

It is certified that error appears in the above-identified patent and that said Letters Patent is hereby corrected as shown below:

On the title page, Item [57] in the Abstract:

line 4; change "about" to ---above---.

Column 10, line  2; before "yieldably" insert ---for---.
            line 22; before "having" insert ---and---.
Column 11, line 53; before "having" insert ---and---.
Column 12, line 47; before "having" insert ---and---.
Column 14, line 25; change "mechanism" to ---mechanisms---.
Column 15, line 20; before "rotatably" insert ---a---.

Signed and Sealed this

Twelfth Day of October, 1993

Attest:

BRUCE LEHMAN

*Attesting Officer*      *Commissioner of Patents and Trademarks*